Figure 1:
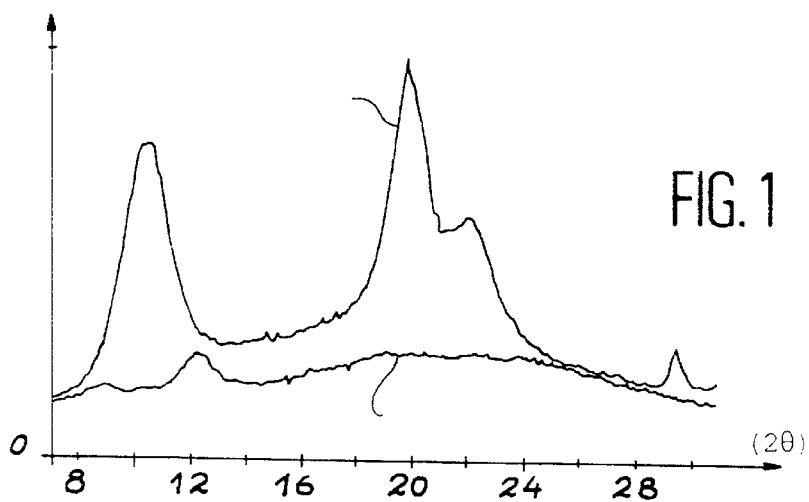

United States Patent [19]
Domard et al.

[11] Patent Number: 5,932,107
[45] Date of Patent: Aug. 3, 1999

[54] METHOD OF SEPARATING AT LEAST ONE METAL PRESENT IN A SOLUTION BY FIXATION ONTO A CHITOSANE

[75] Inventors: Alain Domard, Lyons; Estelle Piron, Vaux-S/S-Bornay; Véronique Federici, Manosque; Yves Berton, Le Puy Ste Reparade, all of France

[73] Assignee: Commissariat a l'Energie Atomique, France

[21] Appl. No.: 08/801,641

[22] Filed: Feb. 18, 1997

[30] Foreign Application Priority Data

Feb. 15, 1996 [FR] France ................................. 96 01870

[51] Int. Cl.$^6$ .................................................. B01D 15/00
[52] U.S. Cl. ......................... 210/682; 210/687; 210/688; 210/912; 210/914
[58] Field of Search ................................. 210/681, 682, 210/687, 688, 912, 913, 914

[56] References Cited

U.S. PATENT DOCUMENTS

| | | | |
|---|---|---|---|
| 4,031,025 | 6/1977 | Vanlerberghe et al. | 210/698 |
| 4,125,708 | 11/1978 | Masri et al. | 210/688 |
| 4,929,722 | 5/1990 | Partain et al. | 210/500.27 |
| 4,992,180 | 2/1991 | Onodera et al. | 210/688 |
| 5,010,181 | 4/1991 | Coughlin | 536/20 |

FOREIGN PATENT DOCUMENTS

| | | |
|---|---|---|
| A-2 599 048 | 11/1987 | France . |
| 2261838 | 10/1990 | Japan . |
| 746870 | 3/1956 | United Kingdom . |
| 2 228 259 | 8/1990 | United Kingdom . |

OTHER PUBLICATIONS

Article: Hsien, et al., "Effects of Acylation and Crosslinking on the Material Properties and Cadmium Ion Adsorption Capacity of Porous Chitosan Beads," *Chemical Abstracts*—vol. 123, p. 610 (1995).

"Questel Plus" Search.

Article "Elimination des Metaux Lourds par Adsorption sur Materiaux d'Origine Biologique", Charrier et al., TSM No. 6, Jun. 1994.

*Primary Examiner*—Ivars Cintins
*Attorney, Agent, or Firm*—Burns, Doane, Swecker & Mathis LLP

[57] ABSTRACT

The invention relates to a method for separating metals present in a solution using chitosane. According to the present invention, chitosane in modified physical form is used which allows faster, more extensive fixation of the metals present in a solution. This purpose is achieved using a method in which the chitosane used is a lyophilizate of chitosane, in particular a lyophilizate of chitosane salt.

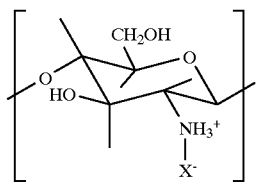

24 Claims, 2 Drawing Sheets

METHOD OF SEPARATING AT LEAST ONE METAL PRESENT IN A SOLUTION BY FIXATION ONTO A CHITOSANE

DESCRIPTION

The present invention relates to a method for separating at least one metal present in a solution by fixation onto a chitosane.

The metals concerned by said method are for example heavy metals such as cadmium, mercury etc. . . alkaline earth metals, actinides, transuranic elements, and fission products. All these substances constitute an extensive source of pollution and it is of primary importance to extract them from industrial or laboratory solutions before they are discharged into the natural environment.

The field of application of the method of the invention extends from the treatment of solutions which are industrial effluents, of any source, for example surface processing industries, mineral production sites, enriching and processing units, effluents from nuclear stations, to the treatment of solutions produced by chemical laboratories and nuclear study centres.

This wide field of application demonstrates the interest of this method of fixing metals in a solution onto chitosane as an alternative to conventional physico-chemical techniques.

Methods using chitosane permitting the separation of metals present in a solution are already known in the prior art.

One of these methods, for example, is described in FR-A-2 101 276. This method consists of using a solution of chitosane, which is partially deaminated and if necessary deacetylated, as a coagulation agent for impurities such as compounds of alkaline earth metals, in an aqueous solution.

A study into improving the efficiency of the separation of heavy metals from a solution by fixation onto chitosane was published in TSM, N°6-1994-89th year, p. 321–326. It clearly emerges from this study that in order to improve the performance of metal fixation onto chitosane, it is necessary to make chemical changes to said chitosane. These chemical changes consist of grafting functional groups which are for example organic acids. This method therefore requires the additional steps of chemical changes which may give rise to certain difficulties of implementation.

The purpose of the present invention is precisely to provide a method for separating metals using chitosane which has not been chemically modified but has been converted into a physical form leading to greater metal fixation.

According to the invention, the method of separating at least one metal present in a solution to be treated by fixing the metal or metals of said solution to be treated onto chitosane, is conducted by using a lyophilizate of raw chitosane or a lyophilizate of chitosane salt.

The physical modification of chitosane through lyophilization allows the metal or metals in aqueous solution to be eliminated in much more efficient manner than with non-lyophilized raw chitosane. The adsorption kinetics of the metals are markedly faster than those obtained using chitosane dried by a conventional method.

According to the invention, the chitosane of the lyophilizate may be raw chitosane or a derivative of chitosane (chitosane salt, substituted derivative of chitosane or salt of a substituted derivative of chitosane).

Raw chitosane is obtained by N-deacetylation of chitin, a polysaccharide found chiefly as a structure polymer of exoskeletons of arthropods and of cellular walls of most fungi. The term "chitosane" relates to chitin soluble in an aqueous medium in diluted acids, that is to say generally for N-acetylation levels of less than 30%. Chitosane is still called: poly [β-(1→4)-2-amino-2-desoxy-D-glucopyrenose)-co (β—(1-→4) 2-acetamido-2-desoxy-D-glucopyranose].

Its structural formula is:

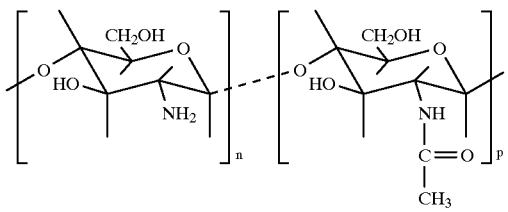

in which:

n=number of residues of 2-amino-2-desoxy-D-glucopyranose, p=number of residues of 2-acetamido-2-desoxy-D-glucopyranose $i = n + p$ and the extent of N-acetylation is:

$$DA = \frac{p}{i}$$

Chitosane is characterized by its strong affinity for heavy metals on account of its free doublets of amine functions which are the source of mechanisms of complexation and fixation of these metal ions. It is therefore necessary to use a raw chitosane having a high number of free amine functions. The number of free amine functions is related to the level or degree of acetylation (DA). If a high number of free amine functions is required, that is to say of sites able to fix the metals to be extracted from a solution to be treated, a chitosane having a level or degree of acetylation (DA) that is as low as possible must be used, that is to say less than 10%, preferably between 2 and 3%.

The molecular weight of chitosane used is preferably equivalent to or more than 1500 g/mol.

In order to obtain the lyophilizate of chitosane, chitosane is first dissolved in a solution, than lyophilized, preferably after filtering the solution.

In order to obtain a lyophilizate of chitosane salt, raw chitosane can be dissolved in an acid medium, corresponding to the required salt, for example an aqueous solution of an acid which may be an organic acid, for example citric acid, acetic acid etc. . . , or a mineral acid, for example nitric acid, hydrochloric acid, etc. . . However, the mineral acid may not be sulphuric acid as it hydrolyses the β1→4 bonds of chitosane.

The chitosane salt obtained has the following structural formula:

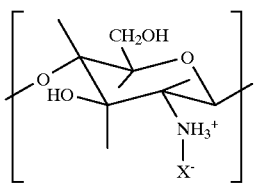

When the acid used is hydrochloric acid, chitosane hydrochlorate is obtained:

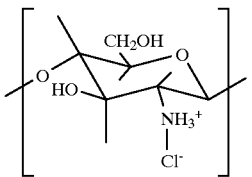

When the acid used is nitric acid, chitosane nitrate is obtained:

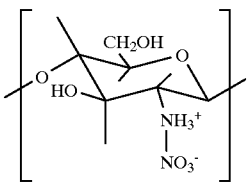

The acid used to dissolve the chitosane is added in stoichiometric quantity or in slight excess in relation to the $NH_2$ groups of the chitosane to be dissolved. The pH of the acid solution used to dissolve the chitosane must be less than 6 so that the chitosane can be dissolved and the quantity of raw chitosane dissolved in this solution is preferably less than 2% by weight.

Preferably the acid solution of raw chitosane is then filtered to eliminate impurities and insoluble residues in order to optimize the quality of the chitosane intended to be lyophilized.

This acid solution of chitosane is then lyophilized using conventional lyophilization techniques comprising freezing the chitosane solution, then drying by sublimation of ice.

The lyophilized chitosane salt obtained is a dry product having the appearance of a sponge with great porosity. Also, the crystallinity level of said lyophilized chitosane salt is three times lower than that of raw chitosane.

The level of crystallinity X may be defined using the quantity x of crystal and the quantity y of amorphous area in the lyophilized chitosane, according to the following formula:

$$X(\%) = \frac{x \text{ crystal}}{x \text{ crystal} + y \text{ amorphous}} \times 100$$

It is calculated by dividing the surface areas corresponding to the crystalline parts by the total surface area of the spectrum:

$$X(\%) = \frac{\text{surface area of crystalline peaks}}{\text{surface area of spectrum}} \times 100$$

the surface area of the spectrum being the sum of the surface area of the crystalline peaks and the surface area of the amorphous zone.

It is determined using the X ray diffraction spectra at wide angles obtained by means of a diffractometer.

The decrease in the level of crystallinity gives a greater overall adsorption rate due to the increase in the number of reactive sites contained in the amorphous areas. Also, the adsorption kinetics are distinctly faster than those obtained using a polymer dried by the conventional method. Lyophilization increases accessibility to reactive sites due to the good dispersion of the polymer and its strong hydrophilic properties. Therefore, the chitosane whose physical form has been modified by lyophilization allows the elimination of metals in an aqueous solution to be made in much more efficient manner than the initial raw chitosane.

To set in operation the method of the invention using a lyophilizate of chitosane salt, the following steps may be used:

a) dispersion of the lyophilizate of chitosane salt in the solution to be treated held at a pH equivalent to or more than 6.5, and b) separation of the lyophilizate of chitosane salt from the solution.

The lyophilizate is dispersed either in a different hydration solution to the solution to be treated which is subsequently added to the solution to be created containing the metals to be separated, or directly in the solution to be treated. It is preferable to disperse the lyophilizate in a different solution to achieve good hydration. The more it is hydrated the faster the kinetics will be.

To obtain good dispersion, a period of at least 2 hours is generally required.

In both cases, dispersion is made in a solution whose pH is maintained at a value equivalent to or higher than 6.5, for example by adding sodium hydroxide under continued stirring for at least 2 hours.

When the lyophilizate of chitosane is dispersed in a hydration solution different to the solution to be treated, it may:

be added to the solution to be treated with the hydration solution, or be separated from the hydration solution before being added to the solution to be treated.

The separation of the dispersed chitosane from the hydration solution may be carried out for example by filtering.

If the pH is lower than 6.5, the chitosane is dissolved in the solution and adsorption of the metals on the latter is no longer possible.

To examine the influence of pH on the adsorption of a metal or a radioelement in a solution or an effluent, tests may be conducted by varying the pH of the solution or the effluent containing the metal or radioelement to be separated at a known concentration or activity by adding a base or an acid.

For this purpose, a known weight of chitosane is added to a fixed volume of effluent and stirred. After a contact period of one hour for example, a sample of effluent is taken without taking a sample of chitosane in order to determine the remaining concentration or activity of the metal or radioelement to be separated. The decontamination factor DF of the effluent is then calculated and its variation in relation to pH value.

It is specified that DF=Co/Cf
where
Co: initial concentration of the metal in the effluent before treatment, and
Cf: final concentration of the metal in the effluent after treatment.

Treatment which does not produce separation of the metal or radioelement from the solution or the effluent is characterized by a DF value of 1. Treatment which allows separation of a metal or a radioelement from the solution or the effluent gives a DF value of more than 1.

Treatment will be all the more effective the higher the DF value.

Using these results the optimum pH is determined for which the decontamination factor is maximum.

Adsorption of metals in a solution or in an effluent to be treated is carried out under continuous stirring for at least 1 hour.

In order to determine the optimum treatment period of a solution or effluent, under stirring, the DF variation at $pH_{opt}$ is examined in relation to the contact time of the chitosane with an effluent. For this purpose a known weight of chitosane is added to a fixed volume of effluent and stirred for contact times varying from example from a few minutes to several days. Samples are taken as previously to determine the concentration or activity of the remaining metal or radioelement. With the determined DF values it is possible to define the optimum contact time between the chitosane and the effluent in order to obtain the required DF or the highest possible DF. The remainder of the tests is conducted at the $pH_{opt}$ of the effluent and with the optimum contact time thus determined.

Also, it is necessary to know the ionic strength of the solutions to be treated as it may have an effect on the metal adsorption capacity on chitosane. In order to modify the ionic strength of the solutions to be treated, sodium nitrate ($NaNO_3$) for example may be used.

The decontamination factor (DF) is also dependent upon the weight of chitosane used. To examine the influence of the latter, increasing weights of chitosane are added to an effluent to be treated, such weights varying conventionally from a few milligrams to a few hundred grams, at the $pH_{opt}$ of the effluent and during the optimum contact time. After stirring for the required contact time, samples are taken as previously. In this way the DF variation can be determined in relation to the weight of chitosane introduced, and the weight of chitosane to be used for a required DF can be determined. Results show that if the chitosane concentration is increased, the DF factor also increases.

Generally, 0.03 to 10 g of lyophilizate are used per liter of solution.

In this lyophilized, very dispersed, very hydrophilic form, chitosane has a high metal adsorption capacity owing to the greater accessibility of the free doublets of the amine functions which are the source of the complexation and fixation mechanisms of the metal ions.

The following step consists of separating the chitosane loaded with metal ions from the solutions to be treated. This separation of the chitosane is made either by filtering or by centrifuging.

Figure 2:
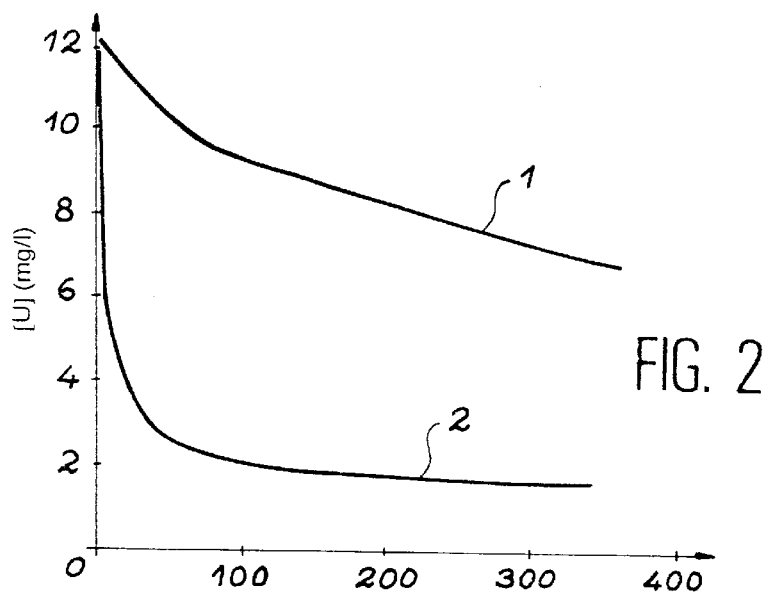
Figure 3:
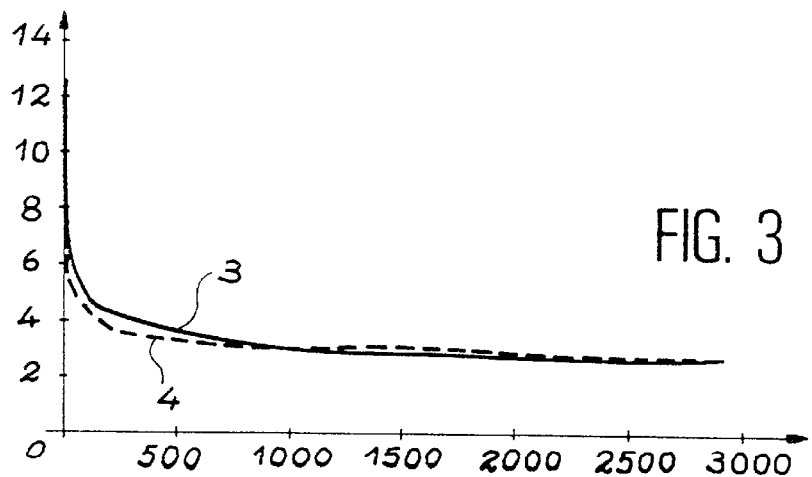
Figure 4:
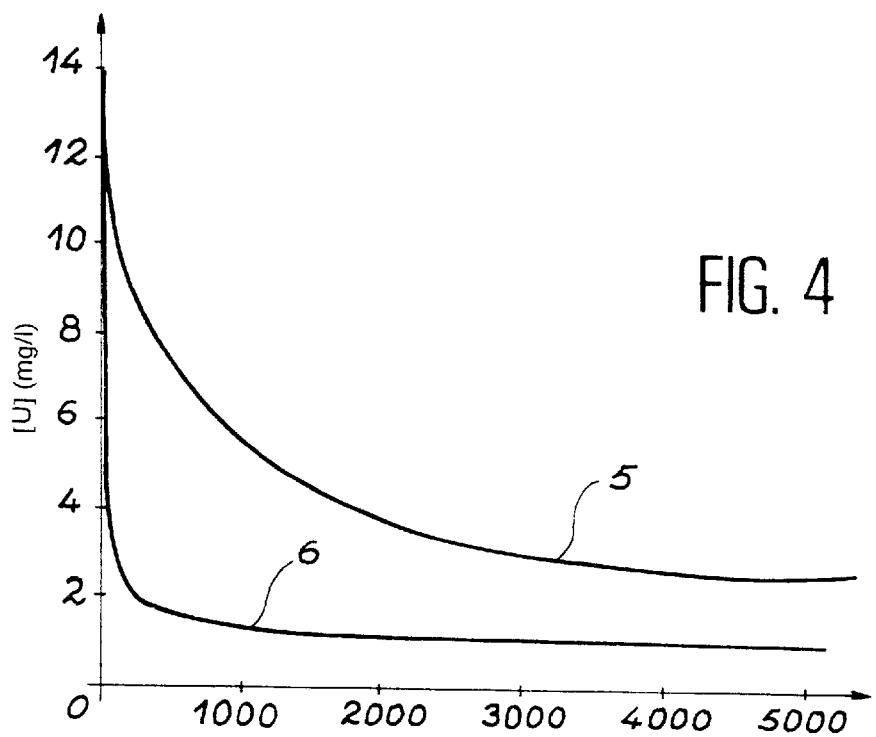
Figure 5:
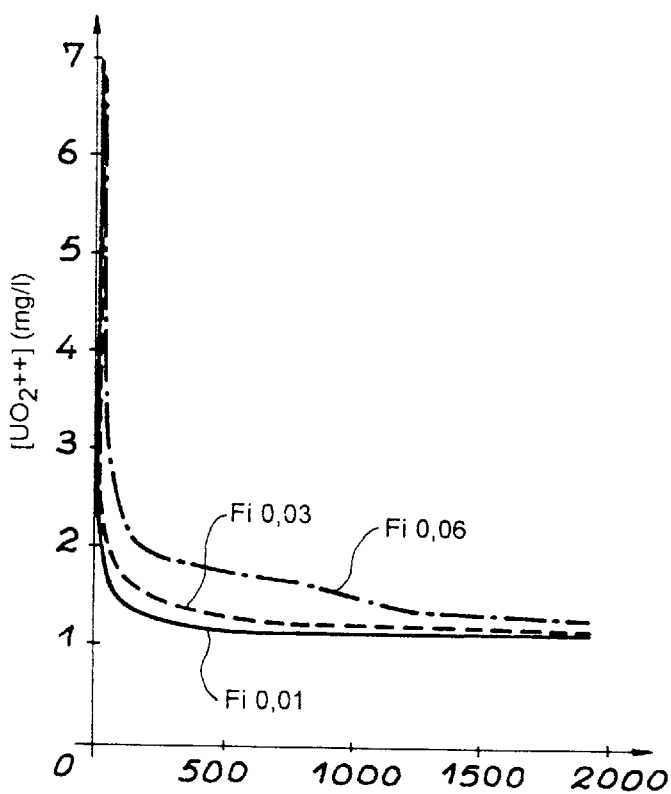

Other characteristics and advantages of the invention will be better understood on reading the following examples—which are evidently given for guidance purposes and are non-restrictive—with reference to the appended drawings in which:

FIG. 1 represents the diffraction spectra of raw chitosane and of a lyophilised chitosane salt, FIG. 2 represents the fixation kinetics of the uranyl ion on raw chitosane and on lyophilized chitosane hydrochlorate, FIG. 3 represents the variations in the concentration of uranyl ions (in mg/l) of a solution in contact with a lyophilizate of chitosane hydrochlorate (curve n°4) and a lyophilizate of chitosane nitrate (curve n°3) in relation to time (in min.), FIG. 4 represents the variations in the concentration of uranyl ions (in mg/l) remaining in solution, at the time of adsorption on raw chitosane and on lyophilized chitosane hydrochlorate in relation to time (in min.), FIG. 5 represents the effect of the ionic strength of the solution on the adsorption of uranyl ions in relation to time (in min.) at a pH of 6.3–6.4.

EXAMPLE 1: PREPARATION OF THE LYOPHILIZATE OF CHITOSANE

The initial product used is raw chitosane which meets the following formula (I):

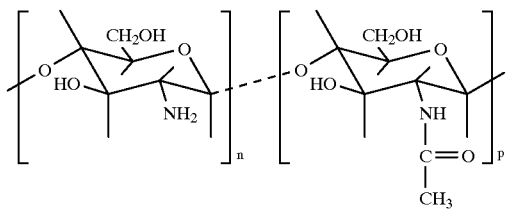

in which n is the number of 2-amino-2-desoxy-D-glucopyranose residues and p is the number of residues of 2-acetamido-2-desoxy-D-glucopyranose.

Its molar weight is equivalent to or more than 1500 g/mol and it has a very low degree or level of acetylation of 2 to 3%. it is therefore rich in free amine functions allowing complexation with the metal or metals.

The acetylation level is measured for example by infrared spectrometry.

The chitosane used in this example is produced by ABER TECHNOLOGY.

Raw chitosane is placed in solution at 1% by weight in de-ionized water and in an acid medium.

The acid used is hydrochloric acid, and it is added in stoichiometric quantity.

The stoichiometric quantity of acid to be added is calculated taking into account the very hygroscopic nature of the chitosane polymer. Thermogravimetric analysis led to determining a water content of 10% by weight of the raw chitosane.

To prepare a lyophilizate of chitosane, 10 g of raw chitosane for example are added to one liter of deionized water. The water content of the chitosane used is 10%, consequently the quantity of chitosane is in fact 9 g. The molar weight of one unit of chitosane being 161 g/mol, 9 g correspond to $5.42\times10^{-2}$ moles of polymer. Since the degree of acetylation of the raw chitosane is 2%, there are 98% free amine functions, that is to say $5.31\times10^{-2}$ moles of free amines. The stoichiometric quantity of hydrochloric acid to be added is therefore $5.31\times10^{-2}$ moles in order to dissolve the polymer without the acid being in excess.

The above is placed under continuous stirring until full dissolution of the chitosane. The solution is then filtered through a Millipore filter with a pore diameter of 0.45 $\mu$m to 3 $\mu$m, in order to eliminate all the impurities and insoluble residues. The solution is then lyophilized.

Lyophilization of the filtered acid solution of chitosane is made using conventional lyophilization apparatus.

Chitosane hydrochlorate is obtained, having the formula:

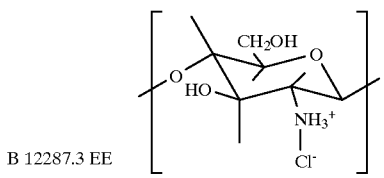

It has the appearance of a very porous, open sponge, fully comparable to a collagen sponge obtained under the same conditions. The fact that the chitosane is in protonic $NH_3^+$ $Cl^-$ form contributes towards the state of hydration of the polymer (despite its almost immediate deprotonation) when it is dispersed in an aqueous medium. Using a salt of chitosane in free amine form increases the hydrophilic properties of the polymer and therefore accelerates the fixation kinetics.

FIG. 1 represents the diffraction spectra of raw chitosane and of lyophilized chitosane hydrochlorate. From these spectra, crystallinity percentages of 35 to 40% for raw chitosane can be deduced, and of approximately 10% for chitosane hydrochlorate. For other salts, such as chitosane nitrate the level of crystallinity is between 10 and 15%.

The crystalline form of lyophilized chitosane is different from that of raw chitosane. The lyophilized chitosane salt has X ray diffraction peaks at 8° and 12°, whereas for raw chitosane they are at 10 and 20°.

This decreased crystallinity is characteristic of the physical change undergone by chitosane through lyophilization, and this reduction in crystallinity gives a higher total metal adsorption rate due to an increase in the number of reactive sites contained in the amorphous areas.

These properties shall be illustrated in the following examples relating to the use of lyophilized chitosane for the separation of one or more metals from a solution.

EXAMPLE 2: SEPARATION OF URANIUM

In this example, the fixation kinetics of the uranyl ion ($UO_2^{++}$) are compared on two chitosanes, one raw not having undergone lyophilization, the other in the form of lyophilized chitosane hydrochlorate.

Raw chitosane is used in the form marketed by ABER TECHNOLOGY, that is to say in the form of flakes obtained by conventional drying means, different to lyophilization (incubation, oven drying etc. . . )

Chitosane hydrochlorate is prepared as described under Example 1 using raw chitosane dissolved with a stochiometric quantity of 0.1 M HCl, filtered and (then lyophilized.

In each case, 30 mg of chitosane are dispersed in deionized water containing 0.03 mol/l of sodium nitrate and $5.10^{-5}$ mol/l of uranyl nitrate while maintaining the pH at 6.5 at room temperature. Uranyl nitrate is introduced in the form of hexahydrated uranyl nitrate crystals supplied by MERCK.

Uranium separation by the two forms of chitosane is carried out under the following identical conditions:

The chitosane is put in solution 15 hours before uranyl nitrate is added, and placed under continuous stirring at a pH of 6.5 to allow proper swelling and hydration of the polymer. At this pH the chitosane in salt form is instantaneously deprotonated and returns to free amine form. The raw chitosane and chitosane hydrochlorate are both in the form of free amines. The solution of uranyl nitrate is then added, and the pH stabilized at 6.5–6.6 by additions of soda or nitric acid. Samples are taken regularly and the uranyl content remaining in the solution is titrated by inductively coupled plasma atomic emission spectrometry (ICP AES). In this way adsorption kinetics are obtained which allow a comparison to be made with the influence of the change in the physical form of chitosane, through lyophilization, on adsorption kinetics.

FIG. 2 illustrates the fixation kinetics of the uranyl ion on the two physical forms of chitosane: raw chitosane (curve 1) and chitosane hydrochlorate lyophilized according to the present invention (curve 2).

It will be noticed that the adsorption kinetics of the uranyl ion for lyophilized chitosane hydrochlorate are much faster than those obtained with raw chitosane.

These results allowed the share coefficients $K_d$ of the uranyl ion to be calculated in relation to time according to the formula:

$$Kd = \frac{(Co - C_{eq}) \cdot V}{C_{eq} \cdot m} \text{expressed in ml/g}$$

in which:

V represents the volume of effluent, expressed in ml m represents the weight of chitosane, expressed in mg Co represents the initial concentration of the metal in the solution, expressed in mg/l C represents the balance concentration of the metal in the solution, expressed in mg/l Table I below represents the share coefficients Kd, expressed in ml/g, of the uranyl ion obtained in relation to time for the different forms of chitosane.

TABLE I

| Contact time (min) | Chitosane Cl— | Raw chitosane |
|---|---|---|
| 10 | 30 700 | 170 |
| 40 | 61 000 | 1 850 |
| 320 | 111 000 | 13 000 |

It can be deduced from this table that under identical operating conditions, the share coefficients are higher with the lyophilized chitosane salt than with raw chitosane.

EXAMPLE 3: SEPARATION OF URANIUM USING DIFFERENT LYOPHILIZED CHITOSANE SALTS

This example allows a comparison to be made between the separation efficiency of chitosane nitrate compared with chitosane hydrochlorate.

Tests are conducted in two liters of solution with 30 mg of lyophilized chitosane salt, a uranyl ($UO_2$) concentration of $5.10^{-5}$ mol/l, a pH of 6.5 and at room temperature.

The measured uranyl concentrations were as follows:

TABLE II

| Contact time (min) | [UO₂⁺⁺] in mg/l | |
|---|---|---|
| | Chitosane hydrochlorate | Chitosane nitrate |
| 0 | 12.4 | 12.6 |
| 10 | 6 | 6.2 |
| 20 | 5.85 | 6 |
| 40 | 5 | 5.5 |
| 90 | 4.1 | 4.7 |
| 180 | 3.6 | 4 |
| 600 | 3.2 | 3.65 |
| 1440 | 3.1 | 3 |
| 1860 | 2.95 | 2.8 |
| 2880 | 2.75 | 2.8 |

FIG. 3 is a tracing of the quantity of $UO_2^{++}$ remaining in the solution in relation to time for each of the chitosane salts. Curve 3 refers to chitosane nitrate and curve 4 to chitosane hydrochlorate.

The adsorption results are equivalent for both lyophilized chitosane salts.

EXAMPLE 4: INCREASE IN THE ADSORPTION CAPACITY OF LYOPHILIZED CHITOSANE

This example allows a comparison to be made between the adsorption capacities of raw chitosane and lyophilized chitosane hydrochlorate for the uranyl ion. For this purpose, 2 l of solution are used with 100 mg of raw chitosane or lyophilized chitosane hydrochlorate and a concentration of uranyl in $UO_2(NO_3)_2$ form of $5 \times 10^{-5}$ M, at a pH of 6.6. The same protocol as for Example 2 is followed, that is to say samples of solution are taken in relation to time in order to determine the remaining uranyl ion content. But, in this example, the protocol is continued until adsorption balance, which is reached at varying speeds depending upon the chitosane used.

FIG. 4 represents the variation in the concentration of uranyl ions in mg/l remaining in the solution, at the time of adsorption on raw chitosane (curve 5) and on lyophilized chitosane hydrochlorate (curve 6) in relation to time (in min).

When adsorption balance is reached, that is to say when the uranyl concentration remaining in the solution remains stable, a lower residual uranyl ion concentration is observed with the chitosane whose physical form has been modified than with the raw chitosane, that is to say the adsorption capacity of the lyophilized chitosane is higher.

The examples demonstrate that the change in the physical form of chitosane through lyophilization allows the metals in aqueous solution to be eliminated in much more efficient manner than non-lyophilized raw chitosane. The adsorption kinetics are much faster than those obtained when using chitosane dried according to conventional methods. Also, the share coefficients and adsorption capacities are higher with the chitosane whose physical form has been modified than with the raw chitosane.

This will be illustrated through the following examples of application to the treatment of effluents, these examples being non-restrictive and given for guidance purposes only.

EXAMPLE 5: TREATMENT OF EFFLUENCE: EFFECT OF IONIC STRENGTH ON THE ADSORPTION OF METALS BY CHITOSANE

In this example, the effect of the ionic strength of an effluent on the decontamination factor is examined.

Effluents to be treated may have very different ionic strengths varying from 0 g/l to over 300 g/l according to their chemical composition. It is therefore important to examine the variation in the decontamination factor (DF) of an effluent by causing a variation in its ionic strength to ensure that, if the composition of the effluent to be treated changes in the course of time, there will be no substantial DF change. For this test, three samples of identical volume are taken from the same effluent with a known concentration of metal or radioelement, and a known weight of chitosane is added to each of these three volumes together with known quantities of sodium nitrate, chemical type forming part of the initial composition of the effluent, in order to obtain three kinetic measurements with three known, different ionic strengths, that is to say:

0.01 M $NaNO_3$=effluent $E_1$
0.03 M $NaNO_3$=effluent $E_2$
0.06 M $NaNO_3$=effluent $E_3$ After a given contact time of the chitosane with effluents $E_1$, $E_2$ and $E_3$, with times reaching 1920 min, samples are taken of said effluents in order to determine their remaining concentration of respective metal or radioelement.

An example of the effect of ionic strength (IS) on the decrease in uranyl ($UO_2^{++}$) concentration in a solution in relation to time is given in table III. Kinetics are carried out in 2 l of effluents, with 68 mg of $NO_3$— chitosane, an initial uranyl concentration of $3 \times 10^{-5}$ M, at a pH of 6.3–6.4.

TABLE III

| Time (min) | IS 0.01 | IS 0.03 | IS 0.06 |
|---|---|---|---|
| 0 | 6.96 | 6.87 | 6.68 |
| 35 | 1.7 | 2.1 | 3 |
| 180 | 1.3 | 1.55 | 1.95 |
| 450 | 1.18 | 1.33 | — |
| 780 | 1.15 | 1.23 | 1.68 |
| 1200 | — | — | 1.38 |
| 1920 | 1.15 | 1.23 | 1.3 |

FIG. 5 is a tracing of the remaining quantity of $UO_2^{++}$, in mg/l, in relation to time, in minutes, for each of the three ionic strengths examined. These results show that adsorption kinetics are faster with a low ionic strength, that is to say at a low concentration of $NaNO_3$(0.01 mol) for short contact times, of less than 1500 min, between the chitosane and the solution. When the chitosane and the solution are in contact for a longer period of more than 1500 min, corresponding to saturation of the amine groups by the uranium, ionic strength only has a reduced effect on the adsorption kinetics of uranyl on chitosane.

EXAMPLES 6 TO 8: TREATMENT OF EFFLUENTS

In these examples, effluents containing Pu 238 having a pH of 12.6 are treated by adding 1 g/l of chitosane in accordance with the methodology described under Example 2. To a known volume of effluent is added a weight corresponding to 1 g/l of chitosane in dispersed form, and after a fixed contact time of 1 hour, the effluent and the adsorbent are separated. The activity of the metal to be separated remaining in the effluent is then determined. The results are expressed as DF decontamination factors.

The results are given in the following table IV:

TABLE IV

| Chitosane | Activity in kBq Pu 238 of the effluent | pH of the effluent before addition of chitosane | pH during test | residual activity in kBq/l | DF |
|---|---|---|---|---|---|
| Lyophilized chitosane salt $NO_3^-$ | 1710 | 12.6 | 12.6 | 190 | 9 |
| Lyophilised chitosane salt $Cl^-$ | 3540 | 12.6 | 12.6 | 417 | 8.5 |
| Raw chitosane in flakes | 1710 | 12.6 | 12.6 | 333 | 5.2 |

The Hague effluent 515-53 as at 28.10.93

The pH of the effluent is maintained at a pH value of 12.6, after adding chitosane, in order to obtain DF results at equivalent, and therefore comparable, pH values.

EXAMPLE 9: SEPARATION OF PLUTONIUM IN AN EFFLUENT OF NUCLEAR ORIGIN

The test is conducted under operating conditions that are identical to Examples 6 to 8, the effluent to be treated has a pH of 12.5, and its salinity is 15 g/l of $NaNO_3$. It contains plutonium PU 238 with an activity of 2800 kBq/l. The remaining PU 238 activity in the effluent was determined after a contact time of one hour. The results expressed in DF are given in Table V below:

TABLE V

|  | Raw chitosane 1 g/l | Chitosane hydrochlorate 1 g/l |
|---|---|---|
| Decontamination Factor DF | 4.5 | 19 |

When the weight of chitosane hydrochlorate is doubled in the effluent to be treated (2 g/l), the DF factor is increased to 32.

EXAMPLE 10: SEPARATION OF AMERICIUM PRESENT IN AN EFFLUENT

The test is conducted under identical operating conditions to those used for Examples 6 to 8. The effluent to be treated has a pH of 12.5 and its salinity is 15 g/l of $NaNO_3$. It contains Am 241 with an activity of approximately 1000 kBq/l. The activity of the Am 241 remaining in the effluent was determined after a contact time of one hour. The results are given in Table VI below:

TABLE VI

|  | Raw chitosane 1 g/l | Chitosane hydrochlorate 1 g/l |
|---|---|---|
| Decontamination Factor DF | 4.8 | 84 |

When the weight of chitosane hydrochlorate is doubled in the effluent to be treated (2 g/l) the DF factor is increased to 160.

Chitosane whose physical form has been modified allows heavy metals, alkaline-earth metals, actinides, transuranic elements and fission products in effluents of industrial and nuclear origin to be trapped more efficiently than with raw chitosane.

What is claimed is:

1. Method for separating at least one metal present in a solution by fixation of the metal or metals onto chitosane, said method comprising contacting a solution comprising at least one metal with a lyophilizate of raw chitosane, a lyophilizate of a chitosane salt of a mineral acid other than sulfuric acid, or a mixture thereof.

2. Method in accordance with claim 1, wherein the chitosane salt is a hydrochlorate, nitrate, or a mixture thereof.

3. Method in accordance with claim 2, wherein the chitosane has an acetylation level of less than 10%.

4. Method in accordance with claim 3, wherein the average molar weight of the chitosane used is equivalent to or more than 1500 kg/mole.

5. Method in accordance with claim 2, wherein the average molar weight of the chitosane used is equivalent to or more than 1500 kg/mole.

6. Method in accordance with claim 1, wherein the chitosane has an acetylation level of less than 10%.

7. Method in accordance with claim 6, wherein the average molar weight of the chitosane used is equivalent to or more than 1500 kg/mole.

8. Method in accordance with claim 1, wherein the average molar weight of the chitosane used is equivalent to or more than 1500 kg/mole.

9. Method in accordance with claim 1, wherein the lyophilizate of chitosane salt is obtained by dissolving raw chitosane in a mineral acid solution other than sulfuric acid, and lyophilizing the mineral acid solution of chitosane.

10. Method in accordance with claim 9, wherein the acid solution is a solution of HCl or $HNO_3$.

11. Method in accordance with claim 10, wherein the lyophilizate of chitosane salt is obtained from chitosane solutions with a concentration by weight of less than 2%.

12. Method in accordance with claim 10, wherein the lyophilizate of chitosane salt is obtained from chitosane solutions with a concentration by weight of less than 1%.

13. Method in accordance with claim 10, wherein the crystallinity level of the lyophilizate is at most equivalent to 15%.

14. Method in accordance with claim 9, wherein the lyophilizate of chitosane salt is obtained from chitosane solutions with a concentration by weight of less than 2%.

15. Method in accordance with claim 9, wherein the lyophilizate of chitosane salt is obtained from chitosane solutions with a concentration by weight of less than 1%.

16. Method in accordance with claim 1, wherein said method further comprises the following steps:
   a) dispersing the lyophilizate of raw chitosane, the lyophilizate of chitosane salt, or the mixture thereof in the solution to be treated while maintaining the pH of the solution at 6.5 or above, and
   b) separating the chitosane from the solution.

17. Method in accordance with claim 16, wherein said separation is made by filtration.

18. Method in accordance with claim 1, wherein said method further comprises the following steps:
   a) dispersing the lyophilizate of raw chitosane, the lyophilizate of chitosane salt, or the mixture thereof in a hydration solution different from the solution to be treated, wherein the pH of said hydration solution is maintained at a value of 6.5 or above,
   b) adding the chitosane dispersed in step a) above to the solution to be treated, and c) separating the chitosane from the solution derived from step b) above.

19. Method in accordance with claim 18, wherein said separation is made by filtration.

20. Method in accordance with any of claims 1 to 19, wherein the metal or metals are selected from the group consisting of heavy metals, alkaline-earth metals, actinides, transuranic elements, and fission products.

21. Method in accordance with claim 20, wherein the solution to be treated is an effluent from nuclear stations or nuclear study centers.

22. Method for separating at least one metal present in a solution by fixation of the metal or metals onto chitosan, said method comprising the steps of:

(a) lyophilizing raw chitosan, a chitosan salt of a mineral acid other than sulfuric acid, or a mixture thereof to provide a lyophilizate of raw chitosan, a lyophilizate of chitosan salt, or a mixture thereof;

(b) mixing the lyophilizate of raw chitosan, the lyophilizate of chitosan salt, or a mixture thereof; with a solution comprising at least one metal in order to fix at least a portion of said metal or metals to the chitosan; and (c) separating the chitosan from step (b) from the solution.

23. Method in accordance with claim 22, wherein the lyophilizate of raw chitosan, the lyophilizate of chitosan salt, or a mixture thereof from step (a) is dispersed in a hydration solution prior to step (b).

24. Method in accordance with claim 22, wherein the separation of step (c) is by filtration.

* * * * *